United States Patent
Kelton et al.

(10) Patent No.: US 7,634,290 B2
(45) Date of Patent: Dec. 15, 2009

(54) ADJUSTING TRANSMIT POWER OF A WIRELESS COMMUNICATION DEVICE

(75) Inventors: James Robert Kelton, Austin, TX (US); James Ward Girardeau, Jr., Austin, TX (US)

(73) Assignee: VIXS Systems, Inc., Toronto, Ontario (CA)

( * ) Notice: Subject to any disclaimer, the term of this patent is extended or adjusted under 35 U.S.C. 154(b) by 597 days.

(21) Appl. No.: 11/140,860

(22) Filed: May 31, 2005

(65) Prior Publication Data

US 2006/0270433 A1 Nov. 30, 2006

(51) Int. Cl.
*H04B 7/00* (2006.01)
(52) U.S. Cl. .................. 455/522; 455/69; 455/115.1; 455/127.1; 375/130; 375/260
(58) Field of Classification Search ................. 455/522
See application file for complete search history.

(56) References Cited

U.S. PATENT DOCUMENTS

| | | | | |
|---|---|---|---|---|
| 5,406,227 A | * | 4/1995 | Williams | 330/306 |
| 5,828,660 A | * | 10/1998 | Baum et al. | 370/330 |
| 6,169,907 B1 | * | 1/2001 | Chang et al. | 455/522 |
| 6,229,486 B1 | * | 5/2001 | Krile | 343/700 MS |
| 6,236,365 B1 | * | 5/2001 | LeBlanc et al. | 342/457 |
| 6,381,230 B1 | * | 4/2002 | Wheatley et al. | 370/328 |
| 6,668,028 B1 | * | 12/2003 | Wieck | 375/349 |
| 6,671,308 B2 | * | 12/2003 | Lomp | 375/130 |
| 6,845,246 B1 | * | 1/2005 | Steer | 455/522 |
| 6,931,256 B2 | * | 8/2005 | Mandyam | 455/522 |
| 6,944,460 B2 | * | 9/2005 | Haartsen | 455/452.2 |
| 6,944,470 B2 | * | 9/2005 | Qian et al. | 455/522 |
| 6,952,181 B2 | * | 10/2005 | Karr et al. | 342/457 |
| 7,010,319 B2 | * | 3/2006 | Hunzinger | 455/522 |
| 7,071,776 B2 | * | 7/2006 | Forrester et al. | 330/129 |
| 7,082,107 B1 | * | 7/2006 | Arvelo | 370/311 |
| 7,096,034 B2 | * | 8/2006 | Zhang et al. | 455/522 |
| 7,099,398 B1 | * | 8/2006 | Girardeau et al. | 375/265 |
| 7,190,965 B2 | * | 3/2007 | Wenzel et al. | 455/522 |
| 7,224,221 B2 | * | 5/2007 | Kobayashi et al. | 330/51 |
| 7,248,845 B2 | * | 7/2007 | Dunn | 455/127.1 |
| 7,292,553 B2 | * | 11/2007 | Tiedemann et al. | 370/335 |
| 7,313,413 B2 | * | 12/2007 | Han | 455/553.1 |
| 7,324,785 B2 | * | 1/2008 | Hansen et al. | 455/69 |
| 7,440,731 B2 | * | 10/2008 | Staudinger et al. | 455/91 |
| 7,483,404 B2 | * | 1/2009 | Zhang | 370/318 |
| 7,499,722 B2 | * | 3/2009 | McDowell et al. | 455/522 |
| 2002/0034170 A1 | * | 3/2002 | Tiedemann et al. | 370/335 |
| 2002/0115468 A1 | * | 8/2002 | Haim | 455/522 |
| 2002/0118729 A1 | * | 8/2002 | Lomp et al. | 375/146 |

(Continued)

*Primary Examiner*—Duc Nguyen
*Assistant Examiner*—Hai V Nguyen
(74) *Attorney, Agent, or Firm*—Garlick, Harrison & Markison; Timothy W. Markison; Bruce E. Stuckman (57) ABSTRACT

A method for adjusting transmit power of a wireless communication device begins by determining requirements of a wireless communication between the wireless communication device and a receiving wireless communication device. The method continues by determining whether a current transmit power level of the wireless communication can be lowered without adjusting the requirements of the wireless communication. The method continues by when the current transmit power level of the wireless communication can be lowered without adjusting the requirements of the wireless communication, adjusting the current transmit power level to a second transmit power level, wherein the second transmit power level is less than the current transmit power level.

16 Claims, 10 Drawing Sheets

U.S. PATENT DOCUMENTS

| | | | |
|---|---|---|---|
| 2002/0119796 A1* | 8/2002 | Vanghi | 455/522 |
| 2002/0122512 A1* | 9/2002 | Lomp | 375/345 |
| 2002/0137535 A1* | 9/2002 | Hunzinger | 455/522 |
| 2002/0167907 A1* | 11/2002 | Sarkar et al. | 370/252 |
| 2003/0064744 A1* | 4/2003 | Zhang et al. | 455/522 |
| 2003/0164794 A1* | 9/2003 | Haynes et al. | 342/353 |
| 2003/0166407 A1* | 9/2003 | Qian et al. | 455/522 |
| 2003/0222819 A1* | 12/2003 | Karr et al. | 342/457 |
| 2004/0018850 A1* | 1/2004 | Ishiguro et al. | 455/522 |
| 2004/0106425 A1* | 6/2004 | Koo et al. | 455/522 |
| 2004/0106426 A1* | 6/2004 | Koo et al. | 455/522 |
| 2004/0198404 A1* | 10/2004 | Attar et al. | 455/522 |
| 2004/0203689 A1* | 10/2004 | Backes et al. | 455/418 |
| 2004/0240582 A1* | 12/2004 | Wenzel et al. | 375/296 |
| 2005/0032514 A1* | 2/2005 | Sadri et al. | 455/423 |
| 2005/0186923 A1* | 8/2005 | Chen et al. | 455/127.1 |
| 2005/0191976 A1* | 9/2005 | Shakeshaft et al. | 455/118 |
| 2005/0227642 A1* | 10/2005 | Jensen | 455/127.1 |
| 2005/0239489 A1* | 10/2005 | Qian et al. | 455/522 |
| 2006/0025158 A1* | 2/2006 | Leblanc et al. | 455/456.2 |
| 2006/0046767 A1* | 3/2006 | Hunzinger | 455/522 |
| 2006/0050798 A1* | 3/2006 | Odigie et al. | 375/259 |
| 2006/0056356 A1* | 3/2006 | Arvelo | 370/332 |
| 2006/0142045 A1* | 6/2006 | Lee et al. | 455/522 |
| 2006/0145842 A1* | 7/2006 | Stilp | 340/539.22 |
| 2006/0189282 A1* | 8/2006 | Hasegawa et al. | 455/127.1 |
| 2006/0264189 A1* | 11/2006 | Turner et al. | 455/127.1 |
| 2006/0268764 A1* | 11/2006 | Harris | 370/328 |
| 2006/0270365 A1* | 11/2006 | Kehlenbach | 455/114.3 |
| 2007/0004351 A1* | 1/2007 | Dekker | 455/127.1 |
| 2007/0042787 A1* | 2/2007 | Hsu et al. | 455/450 |
| 2007/0173277 A1* | 7/2007 | Yun | 455/522 |
| 2007/0280185 A1* | 12/2007 | McFarland et al. | 370/338 |
| 2007/0291639 A1* | 12/2007 | Jacobsen et al. | 370/208 |
| 2008/0108315 A1* | 5/2008 | Hamalainen | 455/127.1 |
| 2008/0108397 A1* | 5/2008 | Piipponen et al. | 455/574 |
| 2008/0132184 A1* | 6/2008 | Wan et al. | 455/115.1 |
| 2009/0130998 A1* | 5/2009 | Zolfaghari et al. | 455/127.1 |
| 2009/0197548 A1* | 8/2009 | Kowalewski et al. | 455/127.1 |

* cited by examiner

| data rate | FEC rate(R) | M-BITS | N(ave)/sym. |
|---|---|---|---|
| 42 Mbps | 2/3 | 4 | 8/3 |
| 48 Mbps | 1/2 | 6 | 3 |

FIG. 4
encoding within processing module 20

FIG. 5
power amplifier curve

FIG. 6
frame 60

ADJUSTING TRANSMIT POWER OF A WIRELESS COMMUNICATION DEVICE

BACKGROUND OF THE INVENTION

1. Technical Field of the Invention

This invention relates generally to wireless communications and more particularly to adjusting transmit power to conserve power and/or reduce interference.

2. Description of Related Art

As is known, a wireless communication from one wireless communication device to another in a wireless communication system can take many forms depending on the standard to which the system is compliant and operational conditions within the system. For example, the wireless communication system may be based on an IEEE 802.11 standard, which provides multiple data rates and modulation schemes for wireless communications. For instance, IEEE 802,11a standard provides data rates 6 Mega Bits Per Second (Mbps), 9 Mbps, 12 Mbps, 18 Mbps, 24 Mbps, 36 Mbps, 48 Mbps, and 54 Mbps and modulation schemes of Binary Phase Shift Keying (BPSK), Quadrature Phase Shift Keying (QPSK), 16 QAM (Quadrature Amplitude Modulation), and 64 QAM.

As is also known, as the data rates increase, the signal to noise ratio (SNR) of a wireless communication must increase as well. This occurs because the higher data rate communications transmit more data per time interval than lower data rate communications and have smaller phase-amplitude differentiation between data values than the lower data rate communications. As such, for the receiver to accurately recapture the transmitted data for high data rate communications, the information details of the signal carrying the data must be readily discernable from noise.

To further enhance a receiver's ability to accurately recapture transmitted data, the transmitter may further encode the data using a coding rate. For instance, the IEEE 802.11a standard provides coding rates of ½, ⅔, and ¾, which indicates the ratio of uncoded bits to encoded bits. For example, rate ½ indicates that for every one bit entering the encoder, the encoder produces a two bit encoded output. In certain instances, lower coding rates (e.g., rate ½) are used for higher data rates and higher coding rates (e.g., rate ¾) are used for lower data rates. As such, the number of bits transmitted is not a linear relationship with the data rate.

As is further known, when a wireless communication is established, the transmitter and/or the receiver determine the data rate based, in part, on the signal-to-noise ratio. Accordingly, the transmitter and/or receiver select the highest data rate that can be supported by the channel, thereby using the least amount of bandwidth of the channel to fulfill the communication.

To achieve acceptable SNR for wireless communications, the transmitter typically transmits at a set power level, which is near the maximum power capabilities of the transmitter. Note that transmitters compliant with IEEE 802.11h utilize transmission power control (TPC) to limit the transmit power to a minimum level needed to reach the furthest receiver of the communication. In addition, transmitters compliant with the IEEE 802.11h standard use dynamic frequency selection (DFS) to select a channel that minimizes interference with other systems.

To achieve an acceptable signal-to-noise ratio for wireless communications, the transmitter typically transmits at a set power level, which is near the maximum power capabilities of the transmitter. Note that transmitters compliant with IEEE 802.11 h utilize transmission power control (TPC) to limit the transmit power to a minimum level needed to reach the furthest receiver of the communication. In addition, transmitters compliant with the IEEE 802.11 h standard use dynamic frequency selection (DFS) to select a channel that minimizes interference with other systems.

Based on the foregoing, a transmitter transmits data at a power level to reliably convey the data to a receiver, where the data is at the highest data rate, using the least amount of bandwidth of the channel, that can be supported by the channel. Accordingly, a peak power level is used while the data is being transmitter. While this provides an efficient use of the channel to support one or more wireless communications, the peak power levels may be at such levels as to interfere with communications on adjacent channels, produce a higher average power than desired due to non linearity of a power amplifier operating close to its compression point, and/or, for multiple communications, may push the transmit power capabilities of the transmitter.

Therefore, a need exists for a method and apparatus of adjusting transmit power of a wireless communication device to control the transmit power levels to reduce power consumption, to reduce peak and/or average power levels, and/or to reduce adjacent channel interference.

BRIEF SUMMARY OF THE INVENTION

The adjusting of transmit power of a wireless communication device of the present invention substantially meets these needs and others. In one embodiment, a method for adjusting transmit power of a wireless communication device begins by determining requirements of a wireless communication between the wireless communication device and a receiving wireless communication device. The method continues by determining whether a current transmit power level of the wireless communication can be lowered without adjusting the requirements of the wireless communication. The method continues by when the current transmit power level of the wireless communication can be lowered without adjusting the requirements of the wireless communication, adjusting the current transmit power level to a second transmit power level, wherein the second transmit power level is less than the current transmit power level.

DETAILED DESCRIPTION OF THE INVENTION

Figure 1:
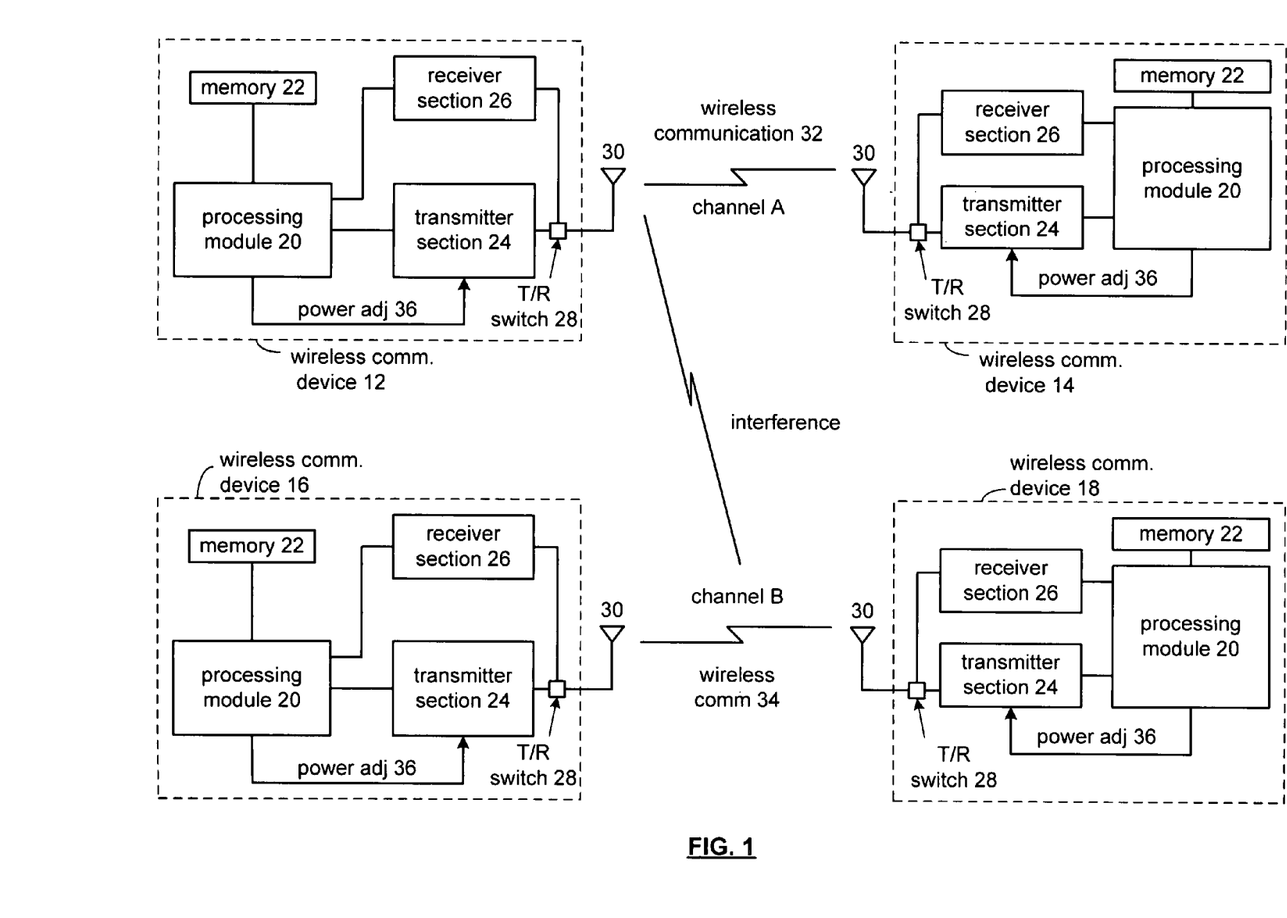
FIG. 1 is a schematic block diagram of a wireless communication system in accordance with the present invention.

FIG. 1 is a schematic block diagram of a wireless communication system that includes a plurality of wireless communication devices 12-16. The wireless communication devices may be stations and/or access points within a wireless local area network, stations and/or servers within a wireless local area video distribution network, cellular telephones, mobile radios, and/or any other device that transceives information via a wireless communication channel.

Each of the wireless communication devices 12-18 include a processing module 20, memory 22, a transmitter section 24, a receiver section 26, a transmit/receive switch 28, and an antenna structure 30. The processing module 20 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 22 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 20 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 22 stores, and the processing module 20 executes, operational instructions corresponding to at least some of the steps and/or functions illustrated in FIGS. 2-13.

In this illustration, wireless communication device 12 is engaged in a wireless communication 32, via channel A, with wireless communication device 14. As is also shown, wireless communication device 16 is engaged in a wireless communication 34 via channel B with wireless communication device 18. As is further shown, the wireless communication 32 on channel A may interfere with the wireless communication 34 on channel B, and vice versa. To minimize the adverse effects of adjacent channel interference, the wireless communication devices 12-18 adjust their transmit power in accordance with a power adjust signal 36, thereby reducing the adverse effects of adjacent channel interference. Further, each of the wireless communication devices 12-18 may reduce its transmit power in accordance with the power adjust signal to reduce peak power, to reduce average power and/or to improve the performance of power amplifiers within each of the transmitter sections 24.

As one of ordinary skill in the art will appreciate, wireless communication device 16 and wireless communication device 12 may be a single device such as an access point, or server in a wireless local area network. As such, the device includes two or more transceivers (i.e., transmitters and receivers) and antenna structures 30 (e.g., one or more antennas) to support two or more wireless communications via multiple channels. As one of ordinary skill in the art will further appreciate, a channel corresponds to a particular carrier frequency and bandwidth in an allocated frequency band for a given type of wireless communication. For example, the IEEE 802.11a standard provides for multiple 20 MHz channels in the frequency band of 5.25-5.35 for wireless LAN communications.

Figure 2:
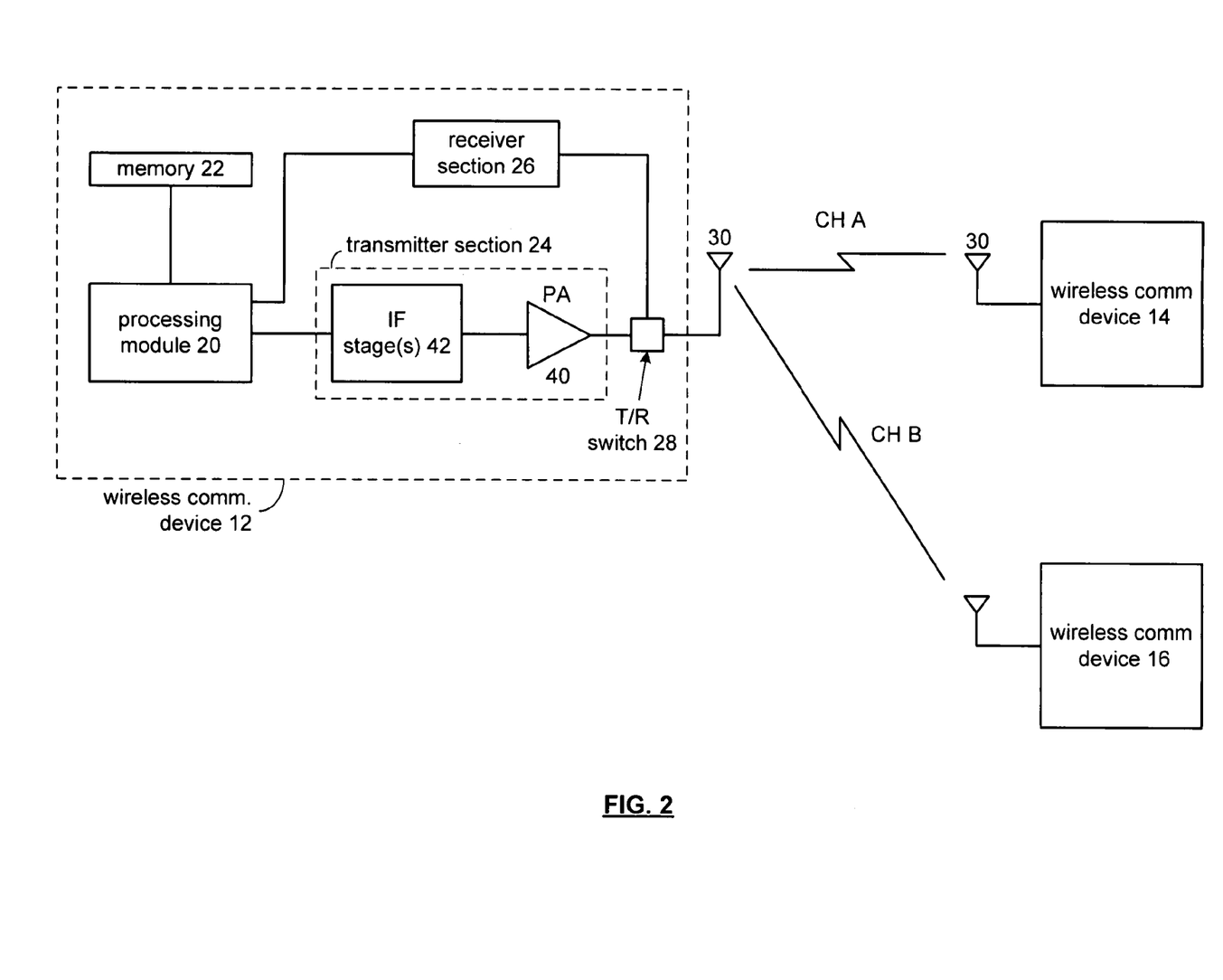
FIG. 2 is a schematic block diagram of a multiple channel communication in accordance with the present invention.

FIG. 2 illustrates a wireless communication system including wireless communication devices 12-16. In this illustration, wireless communication device 12, via a single antenna structure 30, is communicating with wireless communication device 14 and wireless communication device 16 via separate channels (e.g., channel A and channel B). As is shown, wireless communication device 12 includes the processing module 20, memory 22, receiver section 26, transmitter section 24 and transmit receive switch 28. The transmitter section is further shown to include one or more intermediate frequency (IF) stages 42 and a power amplifier 40. The one or more IF stages 42, which may be a super heterodyne or direct conversion structure, are operably coupled to convert outbound signals received from the processing module 20 into radio frequency signals. The power amplifier 40 is operably coupled to amplify the outbound RF signals which are subsequently transmitted via the antenna structure 30. To adjust the transmit power level of the power amplifier 40, the processing module 20 provides the power adjust signal 36 to power amplifier 40.

In this embodiment, since one communication device is supporting multiple communications via multiple channels, it is desirable to control the total transmit power of the transmitter section, and in particular the transmit power level of the power amplifier 40. In accordance with the present invention, the transmit power level for each of the communications via channel A and channel B is adjusted based on one or more factors, as will be described with reference to FIGS. 3-13, to achieve a desired total transmit power level thereby improving the overall efficiency of the wireless communication device 12 by reducing peak power, by reducing average power, by reducing adjacent channel interference, and/or by operating the power amplifier 40 in its more linear region.

Figure 3:
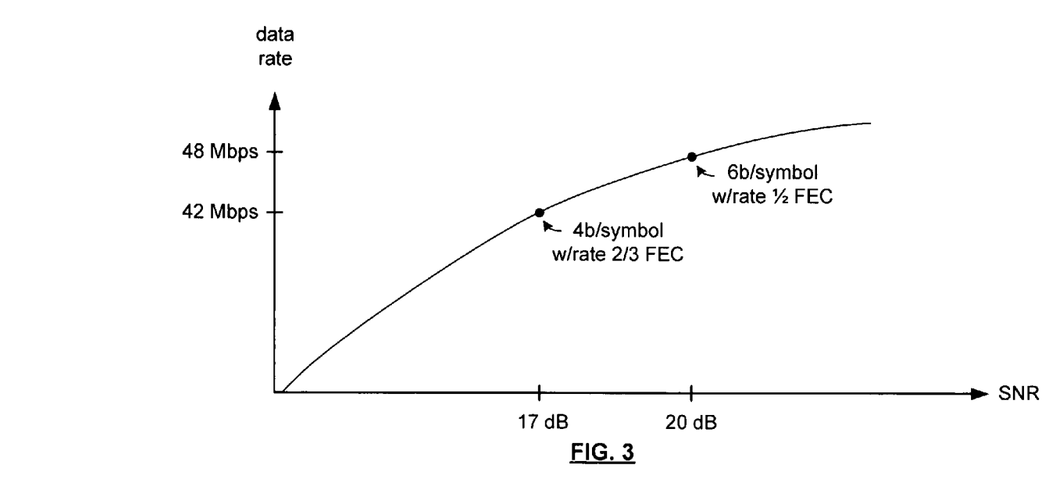
FIG. 3 is a graph of signal-to-noise ratio versus data rate.

FIG. 3 is a graph of signal-to-noise ratio versus data rate. In this illustration, the data rate increases non-linearly with respect to signal-to-noise ratio, which generally implies that to achieve higher data rates, a non-linear increase in transmit power must be used to produce greater signal strength with respect to a noise level. For an example of a given wireless communication, to achieve a data rate of 42 megabits-per-second, which can be represented by a 4-bit symbol using a rate encoding of ⅔, a minimal signal-to-noise ratio may be approximately 17 dB. Further, to achieve a 48 megabits-per-second data rate, which can be represented by a 6 bit-per-symbol symbol encoding with a rate coding of ½, a minimal signal-to-noise ratio may be approximately 20 dB. In accordance with this example, the difference in signal-to-noise ratio between the 42 megabits-per-second case and the 48 megabits-per-second case is greater than the difference between the data rates. As such, if a particular wireless communication can be supported by a 42 megabits-per-second (Mbps) data rate as opposed to a 48 Mbps, a lower signal-to-noise ratio may be used enabling the transmit power to be reduced. For instance, if a wireless communication device initially determines that a particular wireless communication is to be established at a 48 megabits-per-second data rate, the device then determines whether the transmit power level can be reduced by using a lower data rate (e.g., 42 Mbps), and hence a lower signal-to-noise ratio, while maintaining an acceptable level of quality of service and/or fulfilling other requirements of the communication. If so, the devices adjusts the data rate and reduces its transmit power level for the communication.

Figure 4:
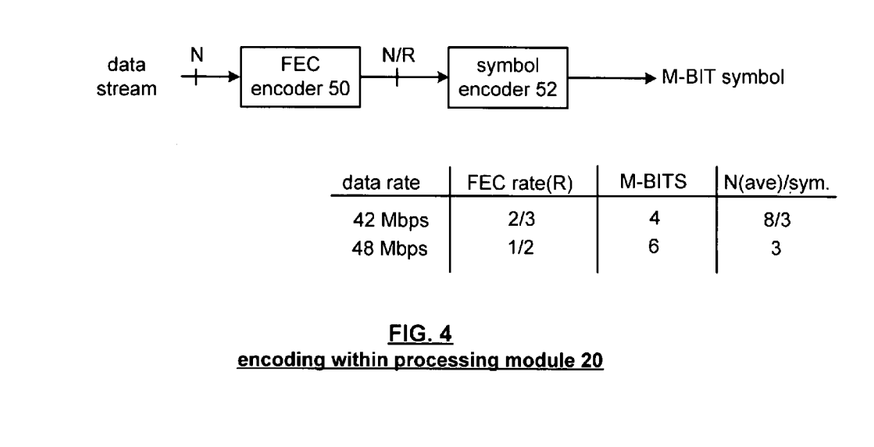
FIG. 4 is a schematic block diagram of encoding in accordance with the present invention.

FIG. 4 is a diagram of the encoding that occurs within the processing module 20. As shown, forward error correction (FEC) encoder 50 converts a data stream into encoded data. On a bit-by-bit basis, for every bit inputted, the FEC encoder produces a greater number of output bits in accordance with the coding rate. For example and as shown in the table, a 42 megabits-per-second data rate may use an FEC encoding rate of ⅔rds, which implies that for every two bits inputted to the FEC encoder 50 three bits will be outputted. As is also shown, for a 48 megabits-per-second data rate, the FEC rate encoding is ½, which implies that for every two bits inputted to the FEC encoder 50, four bits are outputted. As such, on average, more bits are generated to produce the 48 Mbps data rate than are generated to produce the 42 Mbps data rate.

The symbol encoder 52 receives the encoded information from the FEC encoder 50 and produces therefrom an M-bit encoded symbol. With reference to the table of FIG. 4, to produce the 4 bits-per-symbol for a 42 megabits-per-second rate, the FEC encoder uses a ⅔rds encoding rate which for each M-bit output has an average of 8/3rds bits input. In comparison, for a 6 bit-per-symbol output for a 48 megabits-per-second rate, the FEC coding rate is ½ which, on average, requires 3 input bits to produce 6 output bits.

Figure 5:
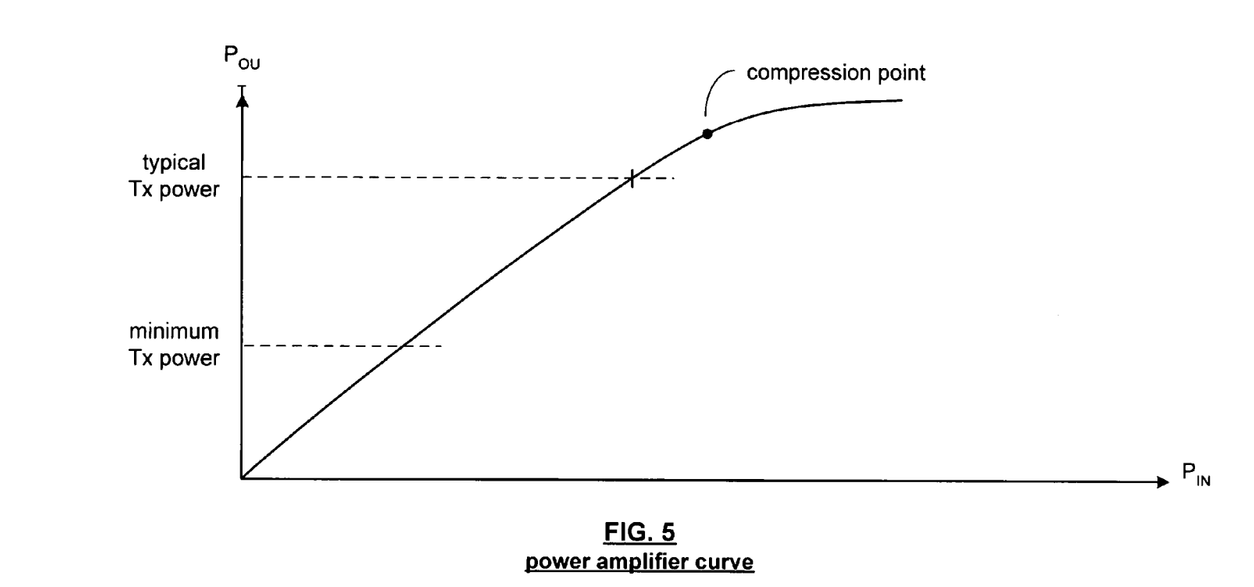
FIG. 5 is a graph of power in versus power out of a power amplifier in accordance with the present invention.

FIG. 5 is a graph depicting power input versus power output of a power amplifier. As shown, the power amplifier has a linear relationship between power input and power output in a mid-range (e.g., between minimal transmit power and typical transmit power) and then loses linearity as it approaches its compression point. Ideally, the power amplifier is operated within the linear range. In prior art embodiments, the power amplifier is typically operated at or near the typical transmit power level. In accordance with the present invention, the minimal transmit power is set at a level which substantially eliminates adjacent channel interference, reduces peak power and average power where further decrease in the power amplifier output yields negligible improvements in adjacent channel interference, average power and/or peak power.

Figure 6:
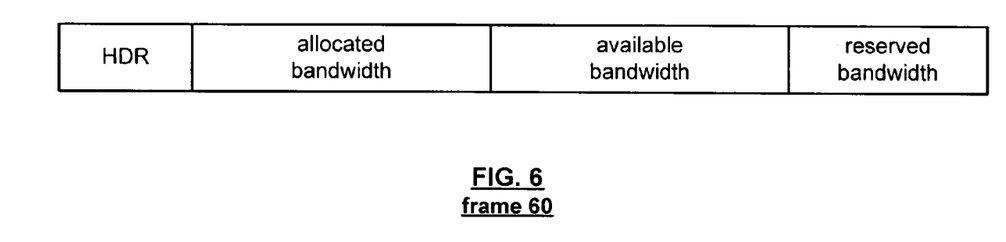
FIG. 6 is a diagram depicting a frame of a wireless communication in accordance with the present invention.

FIG. 6 is a diagram of a frame 60 that includes a header portion and a data portion that includes allocated bandwidth, available bandwidth and reserve bandwidth portions. As is known, a frame is transmitted on each channel for each wireless communication. As is also known, a frame may support multiple communications from one transmitter to multiple receivers. In this example, the frame is analyzed to determine the amount of available bandwidth in comparison to the allocated bandwidth. As is known, a higher data rate consumes less bandwidth than a lower data rate. Thus, before switching from a higher data rate to a lower data rate to reduce transmit power as previously described with reference to FIG. 3, a wireless communication devices determines whether the frame 60 has sufficient available bandwidth to accommodate a change in data rate.

Figure 7:
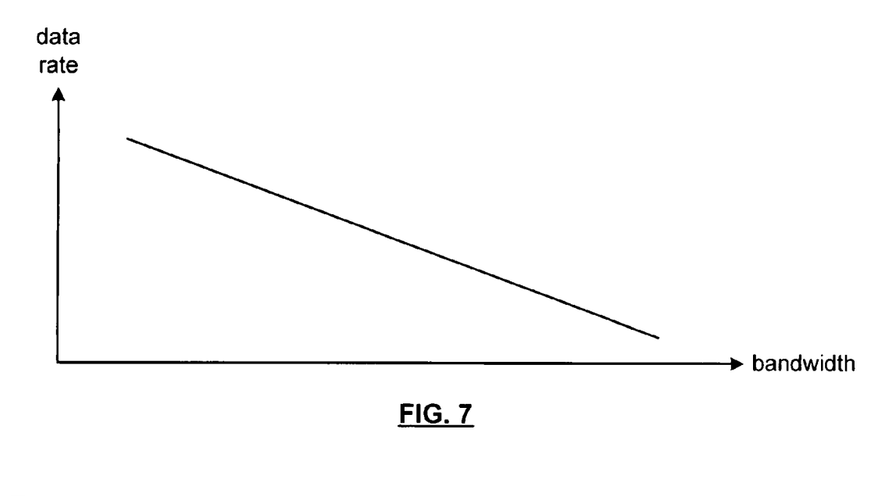
FIG. 7 is a graph of bandwidth versus data rate.

FIG. 7 is a graph depicting bandwidth versus data rate. As shown, the data rate decreases as the required bandwidth increases. Such a relationship may be substantially linear as depicted.

Figure 8:
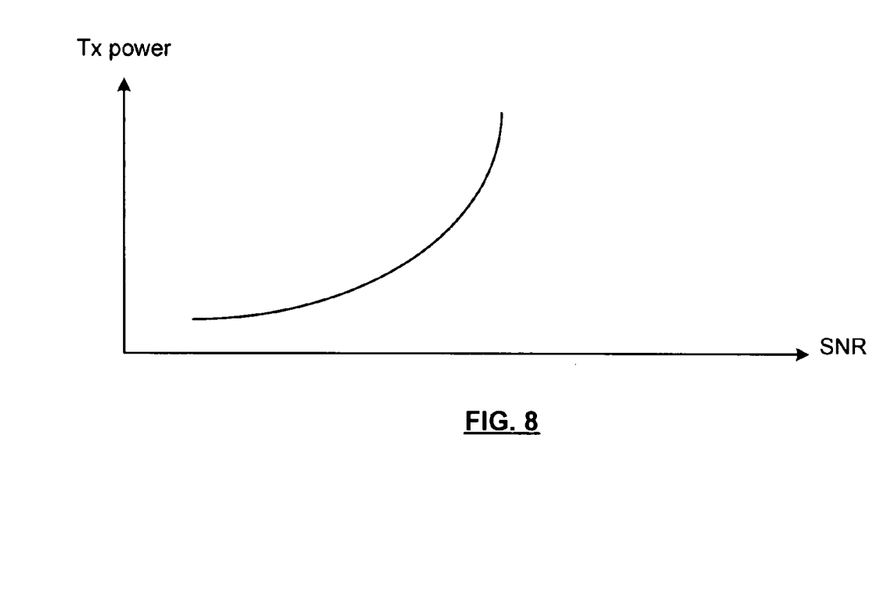
FIG. 8 is a graph of signal-to-noise ratio versus transmit power.

FIG. 8 is a graph that depicts signal-to-noise ratio versus transmit power. As shown, the curve is non-linear and approaches a vertical asymptote based on the component properties within the transmitter. As shown, a greater signal-to-noise ratio is achieved with greater transmit power.

Figure 9:
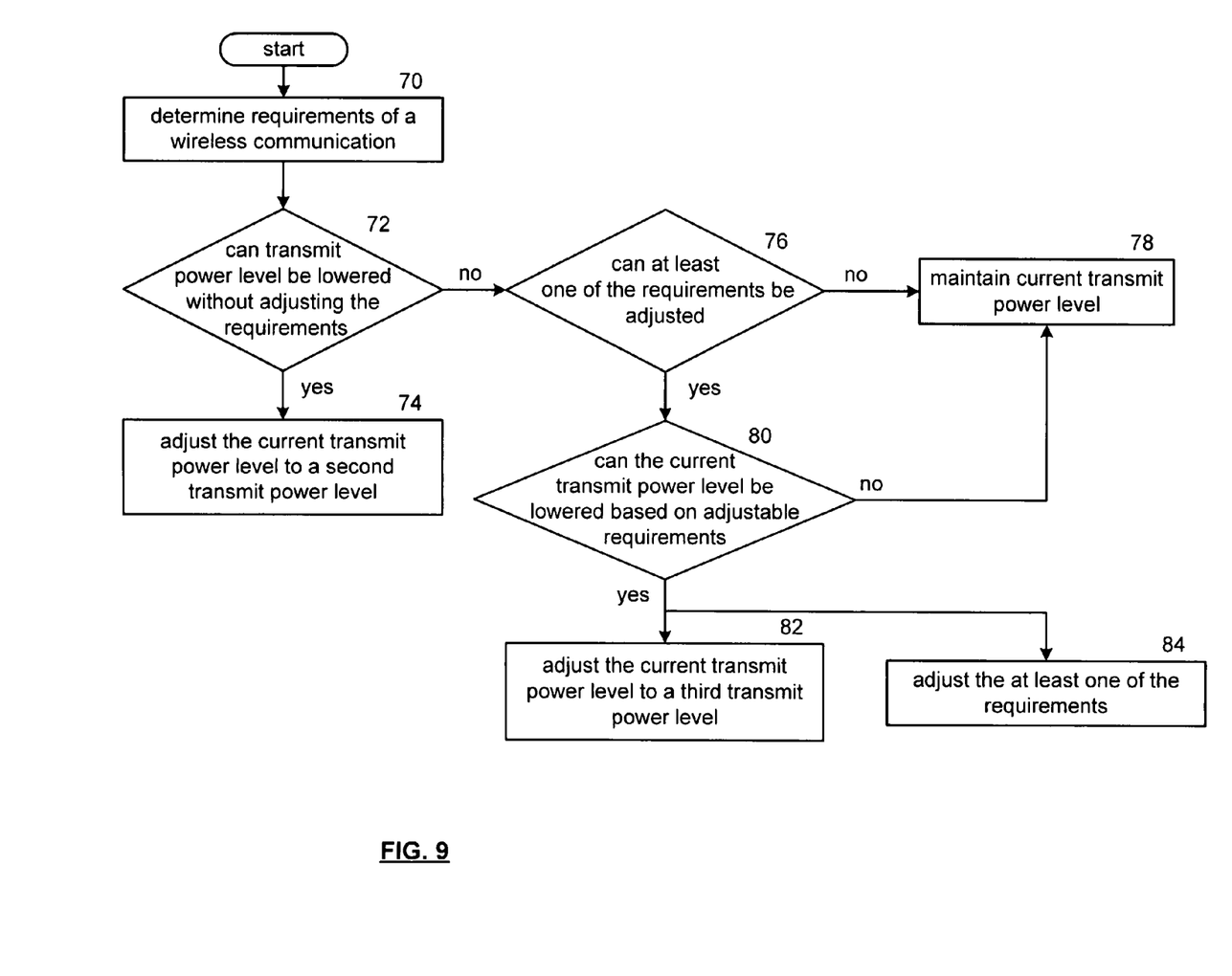
FIG. 9 is a logic diagram of a method for adjusting transmit power of a wireless communication device in accordance with the present invention.

By utilizing the various properties depicted in FIGS. 3-8, a wireless communication devices performing the method of FIG. 9 may adjust its transmit power to improve overall efficiency, reduce adjacent channel interference, reduce peak power and/or reduce average power. The process begins at Step 70 where requirements of a wireless communication are determined. Such requirements include, but are not limited to, the allocated bandwidth of a frame, the available bandwidth of a frame, the initially determined data rate, acceptable lower data rates, signal-to-noise ratio, and/or desired levels of adjacent channel interference. The process then proceeds to Step 72 where a determination is made as to whether the transmit power level can be lowered without adjusting the requirements. For example, a determination is made as to whether there is sufficient headroom in the signal-to-noise ratio to lower the transmit power without having to change the data rate and/or allocated bandwidth. If so, the process proceeds to Step 74 where the transmit power level is adjusted to a $2^{nd}$ level where the $2^{nd}$ level is less than the current transmit power level.

If, however, the transmit power cannot be lowered without adjusting requirements the process proceeds to Step 76. At Step 76, a determination is made as to whether at least one of the requirements can be adjusted. For example, a determination is made as to whether the data rate can be lowered, sufficient bandwidth is available to accommodate the reduction in data rate, whether the adjacent channel interference levels may be adjusted and/or whether adjustments can be made with respect to desired levels of average and/or peak power. If not, the process proceeds to Step 78 where the current transmit power level is maintained.

If, however, at least one of the requirements can be changed, the process proceeds to Step 80 where a determination is made as to whether the transmit power level can be lowered based on the adjustable requirement. For example, if the data rate can be lowered and sufficient bandwidth is available, can the transmit power be lowered and still achieve a desired quality of service for the communication with the lower data rate and increased bandwidth allocation. If not, the process reverts to Step 78.

If the power can be lowered, the process proceeds to Steps 82 and 84 where the power level is adjusted to a $3^{rd}$ transmit power level, which is less than the current transmit power level, and the at least one requirement of the wireless communication is adjusted.

Figure 10:
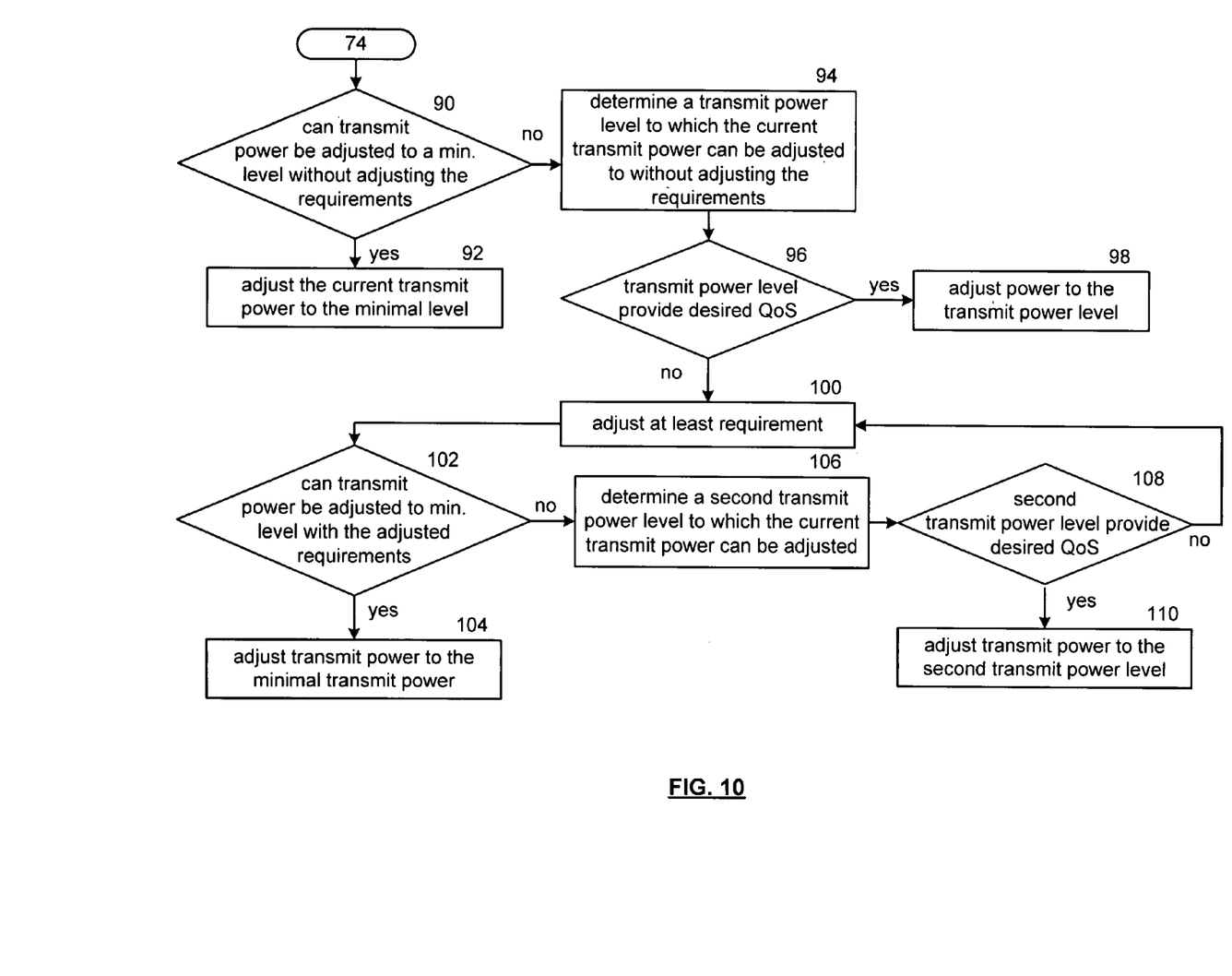
FIG. 10 is a logic diagram of a method that expands on Step 74 of FIG. 9.

FIG. 10 is a logic diagram that further describes the adjusting of the transmit level of Step 74 of FIG. 9. The processing begins at Step 90 where a determination is made as to whether the power level can be adjusted to a minimum power level (e.g., can the power amplifier power level $P_{ou}$ be adjusted to the minimum transmit level as shown in FIG. 5) without adjusting the requirements. If so, the process proceeds to Step 92 where the transmit power level is adjusted to the minimum level.

If, however, the power cannot be adjusted to the minimum level without adjusting the requirements of the communication, the process proceeds to Step 94 where a determination is made as to the level to which the transmit power can be adjusted without adjusting the requirements. The process then proceeds to Step 96 where a determination is made as to whether the level to which the transmit power can be adjusted will provide a desired quality of service, where quality of service includes an acceptable signal-to-noise ratio, accepted level of adjacent channel interference, acceptable level of data throughput, and/or acceptable level of bandwidth allocation. If so, the process proceeds to Step 98 where the power is adjusted to that level.

If, however, the desired level of quality of service cannot be obtained, the process proceeds to Step 100 where at least one of the requirements of the wireless communication is adjusted. The process then proceeds to Step 102 where a determination is made as to whether the transmit power level can be adjusted to the minimum level with the adjusted requirements. If so, the process proceeds to Step 104 where the transmit power is adjusted to the minimum transmit power level.

If, however, the power cannot be adjusted to the minimum transmit power level with the adjusted requirement, the process proceeds to Step 106 where a 2.sup.nd transmit power level to which the power level can be adjusted based on the adjusted requirements is determined. The process then proceeds to Step 108 where a determination is made as to whether a desired quality of service can be obtained. If so, the process proceeds to Step 110 where the transmit power is adjusted to the 2.sup.nd transmit power level. If a desired quality of service cannot be obtained, the process reverts to Step 100 until a power level and adjustments to the requirements of the communication are made to achieve the desired quality of service.

Figure 11:
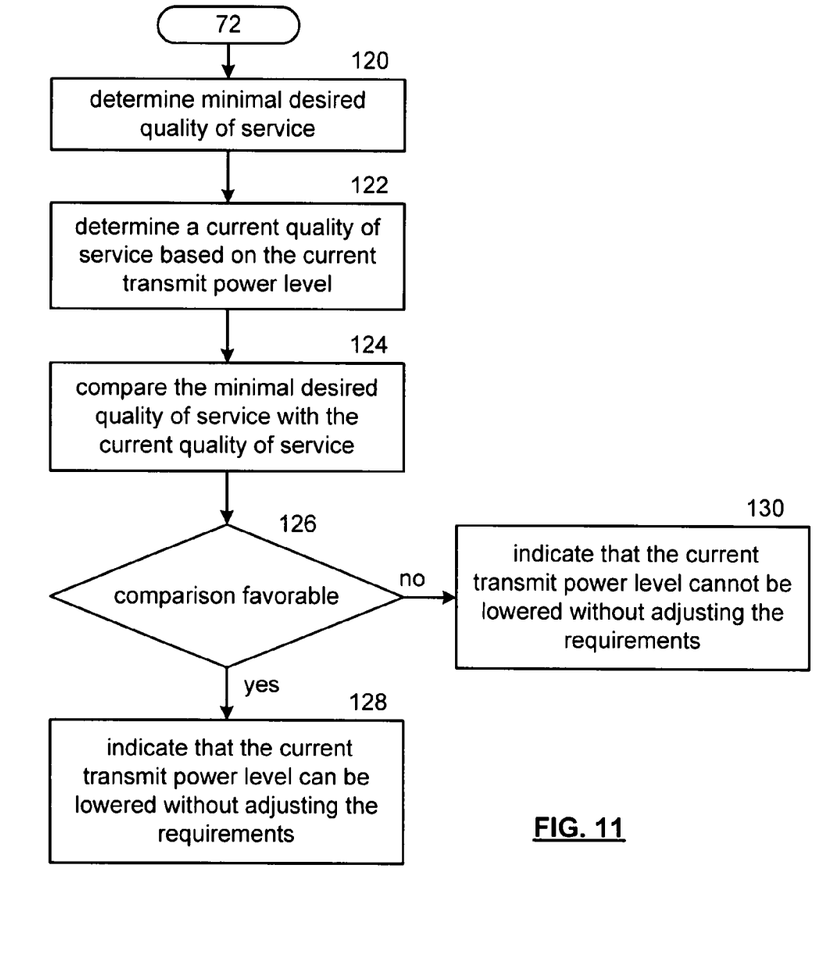
FIG. 11 is a logic diagram of a method that expands on Step 72 of FIG. 9.

FIG. 11 is a logic diagram that further describes the determination of Step 72 of FIG. 9 as to whether the power level can be adjusted without adjusting requirements of the communication. The process begins at Step 120 where a determination is made as to a minimum desired quality of service where the quality of service includes signal-to-noise ratio, adjacent channel interference, data throughput and/or bandwidth allocation. The process then proceeds to Step 122 where a current quality of service is determined for the current transmit power level. The process then proceeds to Step 124 where the minimum desired quality of service is compared with the current quality of service. The process then proceeds to Step 126 where a determination is made as to whether the comparison is favorable. If not, the process proceeds to Step 130 where an indication is provided to indicate that the current transmit power level cannot be lowered without adjusting the requirements. If, however, the comparison at Step 126 was favorable, the process proceeds to Step 128 where an indication is provided to indicate that the current transmit power level can be lowered without adjusting the requirements.

Figure 12:
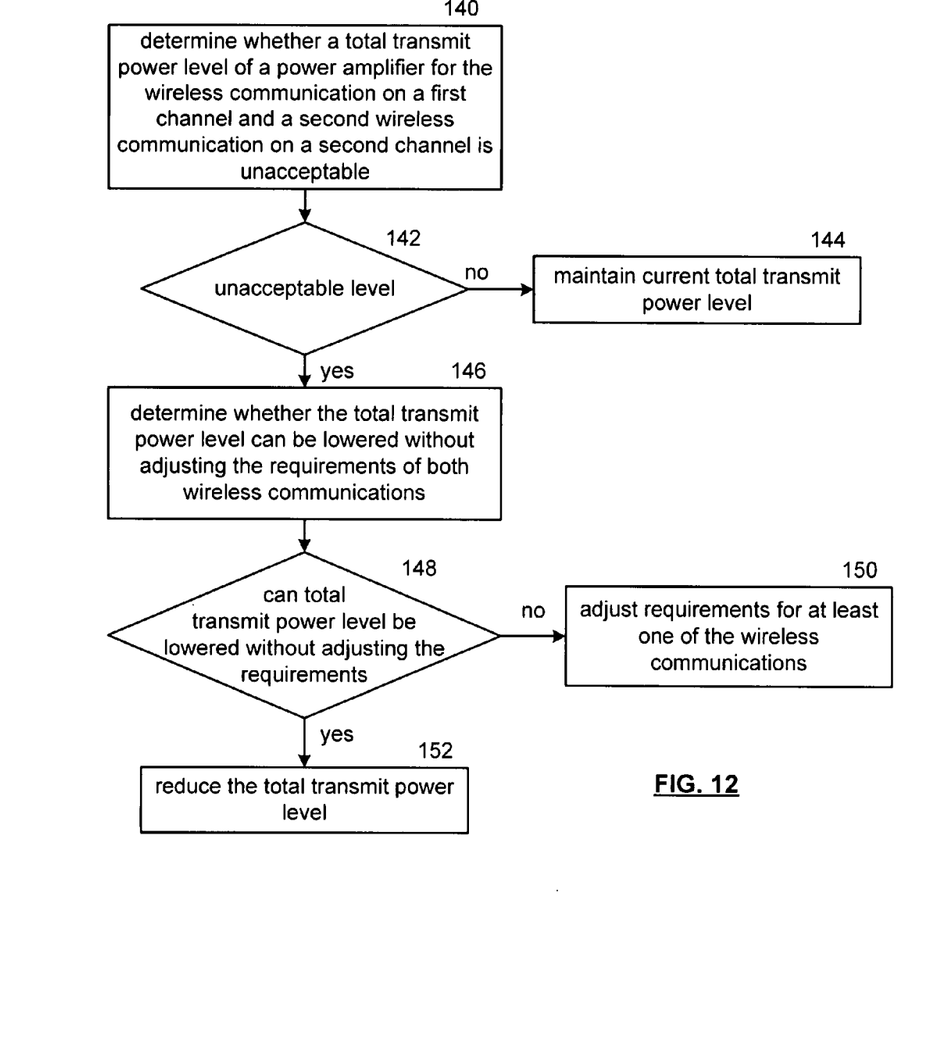
FIG. 12 is a logic diagram of additional steps that may be used in conjunction with the logic diagram of FIG. 9.

FIG. 12 illustrates additional processing steps that may be implemented with the processing steps of FIG. 9. Such additional processing begins at Step 140 where a determination is made as to the total transmit power level of a power amplifier for a wireless communication on a $1^{st}$ channel and a $2^{nd}$ wireless communication on a $2^{nd}$ channel and whether the total power. The process then proceeds to Step 142 where a determination is made as to whether the total power for the multiple communications is unacceptable. If not, the process proceeds to Step 144 where the current total transmit power level is maintained.

If, however, the total transmit power level is unacceptable, the process proceeds to Step 146 where a determination is made as to whether the total transmit power level can be lowered without adjusting requirements of both communications. The process then proceeds to Step 148 where a determination is made as to whether the power level can be adjusted. If not, the process proceeds to Step 150 where one or more requirements of at least one of the wireless communications is adjusted. This may be done in accordance with Steps 76-84 of FIG. 9. If, at Step 148, the power can be adjusted without adjusting the requirements, the process proceeds to Step 152 where the total power level is reduced.

Figure 13:
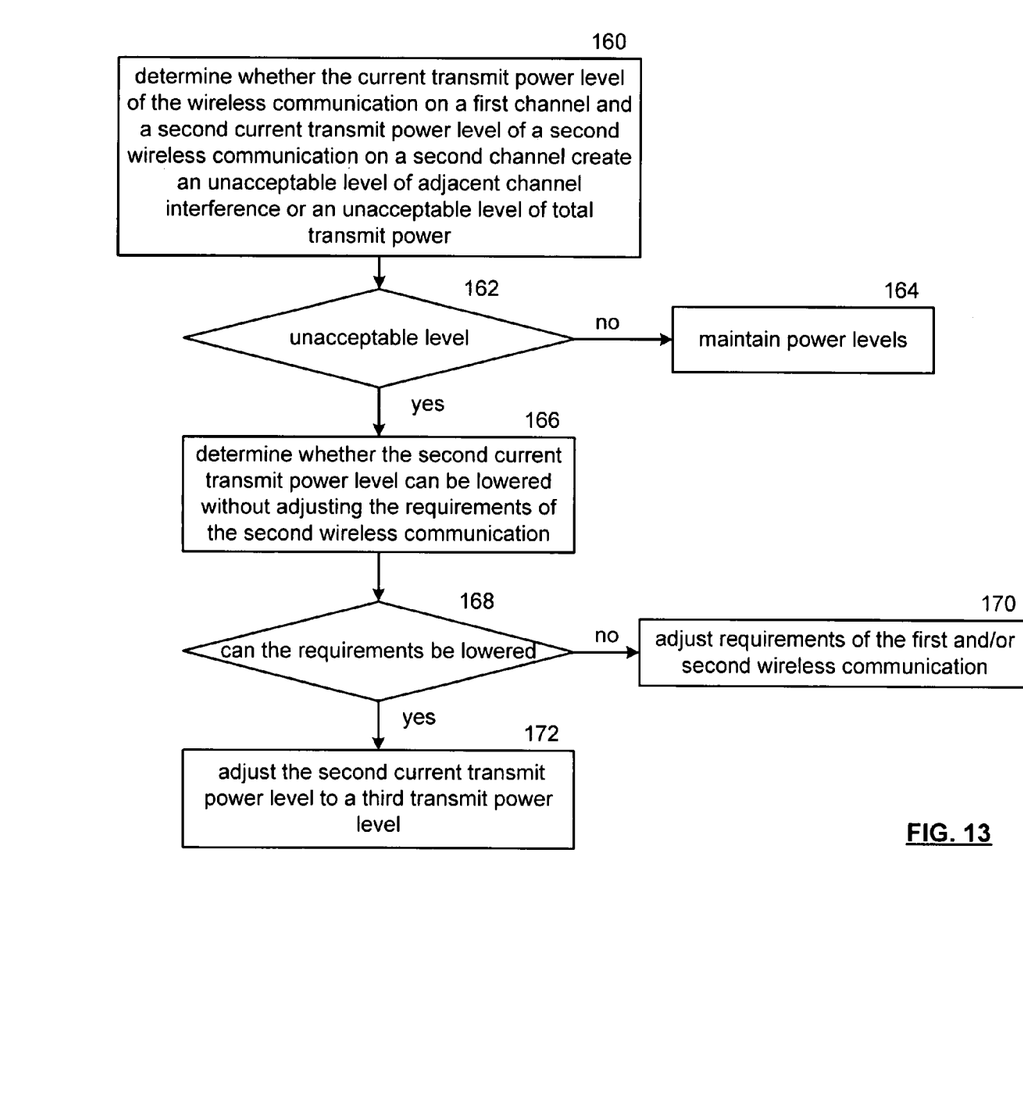
FIG. 13 is a logic diagram of additional steps that may be used in conjunction with the method of FIG. 9 in accordance with the present invention.

FIG. 13 is a logic diagram of additional steps that may be performed in conjunction with the steps of FIG. 9. Such additional processing begins at Step 160 where the current transmit power level of a wireless communication on a $1^{st}$ channel and a $2^{nd}$ current transmit power level of a wireless communication on a $2^{nd}$ channel is determined as to whether it creates an unacceptable level of adjacent channel interference and/or an unacceptable level of total transmit power. The process then proceeds to Step 162 where if the interference and/or total power level is acceptable, the process proceeds to Step 164 where the power levels are maintained.

If, however, the levels are unacceptable, the process proceeds to Step 166 where a determination is made as to whether the $2^{nd}$ current transmit power level can be lowered without adjusting the requirements of the $2^{nd}$ wireless communication. At Step 168 a determination is made as to whether the power can be adjusted without changing the requirements. If not, the process proceeds to Step 170 where the requirements of the $1^{st}$ and/or $2^{nd}$ wireless communication are adjusted in accordance with Steps 76-84 of FIG. 9. If, however, the power can be adjusted without adjusting the requirements, the process proceeds to Step 172 where the power level for the $2^{nd}$ communication is adjusted to a lower transmit power level.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for adjusting the transmit power level of a wireless communication device based on acceptable data rates, available bandwidth, desired adjacent channel interference, desired peak power levels and/or desired average power levels. As one of average skill in the art will appreciate, other embodiments may be derived from the teaching of the present invention without deviating from the scope of the claims.

What is claimed is:

1. A method for adjusting transmit power of a wireless communication device, the method comprises:
   determining requirements of a wireless communication between the wireless communication device and a receiving wireless communication device;
   determining whether a current transmit power level of the wireless communication can be lowered without adjusting the requirements of the wireless communication, the determination being made prior to adjusting the current transmit power level;

when the current transmit power level of the wireless communication can be lowered without adjusting the requirements of the wireless communication, adjusting the current transmit power level to a second transmit power level, wherein the second transmit power level is less than the current transmit power level;

when the current transmit power level of the wireless communication cannot be lowered without adjusting the requirements of the wireless communication, determining whether at least one of the requirements of the wireless communication can be adjusted to produce adjustable requirements of the wireless communication;

when the at least one of the requirements of the wireless communication can be adjusted, determining whether the current transmit power level of the wireless communication can be lowered based on the adjustable requirements of the wireless communication; and when the current transmit power level of the wireless communication can be lowered based on the adjustable requirements of the wireless communication:

adjusting the current transmit power level to a third transmit power level, wherein the third transmit power level is less than the current transmit power level; and adjusting the at least one of the requirements of the wireless communication to produce adjusted requirements of the wireless communication.

2. The method of claim 1, wherein the adjusting the current transmit power level to the second transmit power level comprises:

determining whether the current transmit power level can be adjusted to a minimal transmit power level without adjusting the requirements of the wireless communication; and when the current transmit power level can be adjusted to the minimal transmit power level without adjusting the requirements of the wireless communication, adjusting the current transmit power level to the minimal transmit power level as the second transmit power level.

3. The method of claim 2 further comprises:

when the current transmit power level cannot be adjusted to the minimal transmit power level without adjusting the requirements of the wireless communication, determining a transmit power level to which the current transmit power level can be adjusted to without adjusting the requirements of the wireless communication;

determining whether the transmit power level provides a desired quality of service of the wireless communication; and when the transmit power level provides the desired quality of service of the wireless communication, adjusting the current transmit power level to the transmit power level.

4. The method of claim 3 further comprises:

when the transmit power level does not provide the desired quality of service of the wireless communication, adjusting the at least one of the requirements of the wireless communication to produce an adjusted wireless communication;

determining whether the transmit power level can be adjusted to the minimal transmit power level without adjusting the requirements of the adjusted wireless communication;

when the transmit power level can be adjusted to the minimal transmit power level without adjusting the requirements of the adjusted wireless communication, adjusting the current transmit power level to the minimal transmit power level as the second transmit power level;

when the transmit power level cannot be adjusted to the minimal transmit power level without adjusting the requirements of the adjusted wireless communication, determining a third transmit power level to which the current transmit power can be adjusted to without adjusting the requirements of the adjusted wireless communication;

determining whether the third transmit power level provides a desired quality of service of the adjusted wireless communication; and when the third transmit power level provides the desired quality of service of the adjusted wireless communication, adjusting the current transmit power level to the third transmit power level.

5. The method of claim 1, wherein the requirements of the wireless communication comprises at least one of:

bandwidth;
data rate;
signal-to-noise ratio; and
adjacent channel interference.

6. The method of claim 1, wherein the determining whether the current transmit power level of the wireless communication can be lowered without adjusting the requirements of the wireless communication comprises:

determining a minimal desired quality of service for the wireless communication, wherein the minimal desired quality of service includes at least one of: signal-to-noise ratio; adjacent channel interference, data throughput, and bandwidth allocation; determining a current quality of service of the wireless communication based on the current transmit power level;

comparing the minimal desired quality of service with the current quality of service; and when the comparing of the minimal desired quality of service with the current quality of service is favorable, indicating that the current transmit power level of the wireless communication can be lowered without adjusting the requirements of the wireless communication.

7. The method of claim 1 further comprises:

determining whether a total transmit power level of a power amplifier for the wireless communication on a first channel and for a second wireless communication on a second channel is unacceptable;

when the total transmit power level is unacceptable, determining whether the total transmit power level can be lowered without adjusting the requirements of the wireless communication and requirements of the second wireless communication; and when the total transmit power level of the wireless communication can be lowered without adjusting the requirements of the wireless communication and the requirements of the second wireless communication, reducing the total transmit power level.

8. The method of claim 1 further comprises:

determining whether the current transmit power level of the wireless communication on a first channel and a second current transmit power level of a second wireless communication on a second channel create an unacceptable level of adjacent channel interference or an unacceptable level of total transmit power;

when the unacceptable level of total transmit power or the unacceptable level of adjacent channel interference is determined, determining whether the second current transmit power level of the wireless communication can be lowered without adjusting requirements of the second wireless communication; and when the second current transmit power level of the second wireless communication can be lowered without adjusting the requirements of the second wireless communication, adjusting the second current transmit power level to a third transmit power level, wherein the third transmit power level is less than the current transmit power level.

9. A wireless transmitter comprises:

processing module operably coupled to convert outbound data into outbound baseband signals; and transmitter section operably coupled to convert the outbound baseband signals into outbound radio frequency (RF) signals, wherein the processing module is further operably coupled to:

determine requirements of a wireless communication between the wireless transmitter and a receiving wireless communication device;

determine whether a current transmit power level of the wireless communication can be lowered without adjusting the requirements of the wireless communication, the determination being made prior to adjusting the current transmit power level;

then the current transmit power level of the wireless communication can be lowered without adjusting the requirements of the wireless communication, adjust the current transmit power level to a second transmit power level, wherein the second transmit power level is less than the current transmit power level;

wherein the processing module is further operably coupled to:

when the current transmit power level of the wireless communication cannot be lowered without adjusting the requirements of the wireless communication, determine whether at least one of the requirements of the wireless communication can be adjusted to produce adjustable requirements of the wireless communication;

when the at least one of the requirements of the wireless communication can be adjusted, determine whether the current transmit power level of the wireless communication can be lowered based on the adjustable requirements of the wireless communication; and when the current transmit power level of the wireless communication can be lowered based on the adjustable requirements of the wireless communication:

adjust the current transmit power level to a third transmit power level, wherein the third transmit power level is less than the current transmit power level; and adjust the at least one of the requirements of the wireless communication to produce adjusted requirements of the wireless communication.

10. The wireless transmitter of claim 9, wherein the processing module is further operably coupled to adjust the current transmit power level to the second transmit power level by:

determining whether the current transmit power level can be adjusted to a minimal transmit power level without adjusting the requirements of the wireless communication; and when the current transmit power level can be adjusted to the minimal transmit power level without adjusting the requirements of the wireless communication, adjusting the current transmit power level to the minimal transmit power level as the second transmit power level.

11. The wireless transmitter of claim 10, wherein the processing module is further operably coupled to:

when the current transmit power level cannot be adjusted to the minimal transmit power level without adjusting the requirements of the wireless communication, determine a transmit power level to which the current transmit power level can be adjusted to without adjusting the requirements of the wireless communication;

determine whether the transmit power level provides a desired quality of service of the wireless communication; and when the transmit power level provides the desired quality of service of the wireless communication, adjust the current transmit power level to the transmit power level.

12. The wireless transmitter of claim 11, wherein the processing module is further operably coupled to:

when the transmit power level does not provide the desired quality of service of the wireless communication, adjust the at least one of the requirements of the wireless communication to produce an adjusted wireless communication;

determine whether the transmit power level can be adjusted to the minimal transmit power level without adjusting the requirements of the adjusted wireless communication, when the transmit power level can be adjusted to the minimal transmit power level without adjusting the requirements of the adjusted wireless communication, adjust the current transmit power level to the minimal transmit power level as the second transmit power level;

when the transmit power cannot be adjusted to the minimal transmit power level without adjusting the requirements of the adjusted wireless communication, determine a third transmit power level to which the current transmit power can be adjusted to without adjusting the requirements of the adjusted wireless communication;

determine whether the third transmit power level provides a desired quality of service of the adjusted wireless communication; and when the third transmit power level provides the desired quality of service of the adjusted wireless communication, adjust the current transmit power level to the third transmit power level.

13. The wireless transmitter of claim 9, wherein the requirements of the wireless communication comprises at least one of:

bandwidth;

data rate;

signal-to-noise ratio; and adjacent channel interference.

14. The wireless transmitter of claim 9, wherein the processing module is further operably coupled to determine whether the current transmit power level of the wireless communication can be lowered without adjusting the requirements of the wireless communication by:

determining a minimal desired quality of service for the wireless communication, wherein the minimal desired quality of service includes at least one of: signal-to-noise ratio; adjacent channel interference, data throughput, and bandwidth allocation;

determining a current quality of service of the wireless communication based on the current transmit power level;

comparing the minimal desired quality of service with the current quality of service; and when the comparing of the minimal desired quality of service with the current quality of service is favorable, indicating that the current transmit power level of the wireless communication can be lowered without adjusting the requirements of the wireless communication.

15. The wireless transmitter of claim 9, wherein the processing module is further operably coupled to:
   determine whether a total transmit power level of a power amplifier for the wireless communication on a first channel and for a second wireless communication on a second channel is unacceptable;
   when the total transmit power level is unacceptable, determine whether the total transmit power level can be lowered without adjusting the requirements of the wireless communication and requirements of the second wireless communication; and
   when the total transmit power level of the wireless communication can be lowered without adjusting the requirements of the wireless communication and the requirements of the second wireless communication, reduce the total transmit power level.

16. The wireless transmitter of claim 9, wherein the processing module is further operably coupled to:
   determine whether the current transmit power level of the wireless communication on a first channel and a second current transmit power level of a second wireless communication on a second channel create an unacceptable level of adjacent channel interference or an unacceptable level of total transmit power;
   when the unacceptable level of total transmit power or the unacceptable level of adjacent channel interference is determined, determine whether the second current transmit power level of the wireless communication can be lowered without adjusting the requirements of the second wireless communication; and
   when the second current transmit power level of the second wireless communication can be lowered without adjusting the requirements of the second wireless communication, adjust the second current transmit power level to a third transmit power level, wherein the third transmit power level is less than the current transmit power level.

* * * * *